(12) United States Patent
Zhang et al.

(10) Patent No.: US 9,508,965 B1
(45) Date of Patent: Nov. 29, 2016

(54) HOUSING STRUCTURE WITH BATTERY COVER

(71) Applicant: Chengdu CK Technology CO., LTD., Chengdu (CN)

(72) Inventors: Hua-qiang Zhang, Chengdu (CN); Shou-chuang Zhang, Chengdu (CN)

(73) Assignee: Chengdu CK Technology Co., LTD., Chengdu (CN)

(*) Notice: Subject to any disclaimer, the term of this patent is extended or adjusted under 35 U.S.C. 154(b) by 0 days.

(21) Appl. No.: 15/145,157

(22) Filed: May 3, 2016

(30) Foreign Application Priority Data

Jun. 16, 2015 (CN) .................. 2015 2 04141456 U

(51) Int. Cl.
*G03B 17/02* (2006.01)
*H01M 2/10* (2006.01)

(52) U.S. Cl.
CPC ............ *H01M 2/1066* (2013.01); *G03B 17/02* (2013.01); *G03B 2217/007* (2013.01); *H01M 2220/30* (2013.01)

(58) Field of Classification Search
None
See application file for complete search history.

(56) References Cited

U.S. PATENT DOCUMENTS

| | | | | | |
|---|---|---|---|---|---|
| 5,678,110 | A | * | 10/1997 | Koiwai ................. | G03B 17/02 396/535 |
| 5,903,791 | A | * | 5/1999 | Okada ................... | G03B 17/02 396/535 |
| 2006/0165407 | A1 | * | 7/2006 | Ueda ..................... | G03B 17/02 396/539 |
| 2006/0188249 | A1 | * | 8/2006 | Noguchi ............... | G03B 17/02 396/536 |
| 2009/0325048 | A1 | * | 12/2009 | Dong ................... | H01M 2/0404 429/96 |
| 2010/0092847 | A1 | * | 4/2010 | Li ........................ | H01M 2/1066 429/97 |
| 2010/0124699 | A1 | * | 5/2010 | Ng ....................... | H01M 2/1066 429/100 |
| 2011/0195292 | A1 | * | 8/2011 | Ouyang ............... | H04M 1/0262 429/100 |
| 2013/0141637 | A1 | * | 6/2013 | Kaga ..................... | E06B 7/22 348/373 |
| 2013/0222986 | A1 | * | 8/2013 | Nakatsu ............... | H04N 5/2251 361/679.01 |

* cited by examiner

Primary Examiner — WB Perkey
(74) Attorney, Agent, or Firm — Perkins Coie LLP

(57) ABSTRACT

The disclosed technology is directed to a housing structure with a battery cover. The housing structure enables a user to easily swap a battery positioned therein. The housing structure includes a housing, a push button, a push button cover, and a torsion spring. The housing defines a battery chamber that can accommodate a battery. The push button is positioned adjacent to the housing and supported by the push button cover and the torsion spring. The push button is coupled to a battery cover positioned adjacent to the housing. When a user pushes the push button from the outside of the housing, the battery cover can be moved and/or rotated accordingly such that a gap is formed between the battery cover and the housing. Through the gap, the user can insert a battery into the battery chamber or remove one therefrom.

20 Claims, 3 Drawing Sheets

HOUSING STRUCTURE WITH BATTERY COVER

CROSS-REFERENCE TO RELATED APPLICATIONS

This application claims the benefit of Chinese Patent Application No. 2015204141456, filed Jun. 16, 2015 and entitled "A STRUCTURE WITH AN OPEN BATTERY COVER," the contents of which are hereby incorporated by reference in its entirety.

BACKGROUND

A sports camera usually includes a battery positioned therein so as to provide power for its normal operation such as taking pictures. The battery is covered by a separate battery cover that is latched to a housing of the sports camera. After a period of time of use, the battery cover can become loose to the housing such that the battery could be ejected out of the housing during the camera operation, which interrupts the camera operation. In addition, separate battery covers are usually made in a relatively small size and therefore could easily be lost.

BRIEF DESCRIPTION OF THE DRAWINGS

Embodiments of the disclosed technology will be described and explained through the use of the accompanying drawings.

Figure 1:
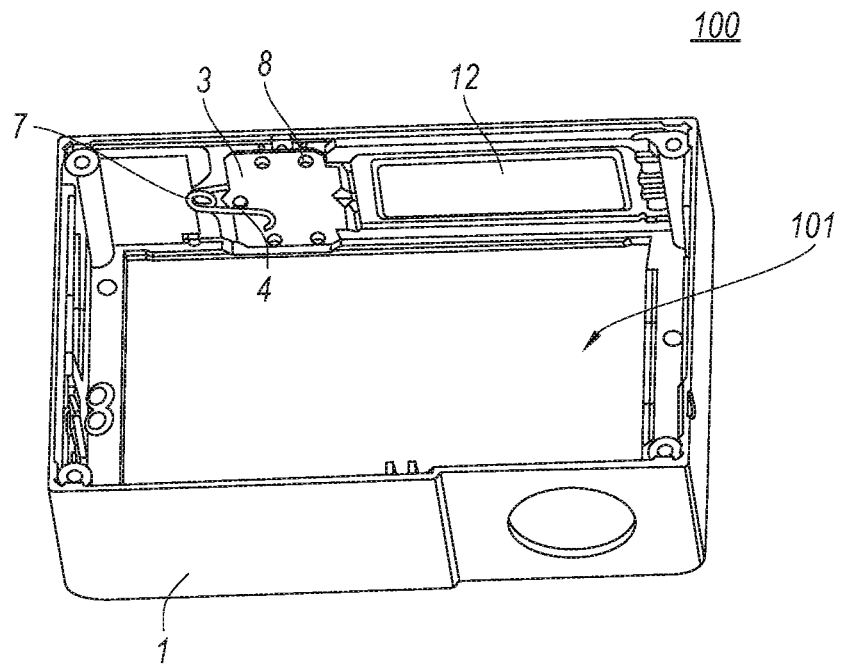
FIG. 1 is an isometric view illustrating a housing structure in accordance with embodiments of the present disclosure.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to one embodiment", some embodiments," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure provides a housing structure with a battery cover that is reliable and durable. The housing structure enables a user to easily swap a battery positioned therein. Advantages of the disclosed housing structure include that it can prevent the battery cover from being accidentally detached from the housing. Traditionally, a user needs to hold a battery cover when inserting/removing a battery. The present disclosure provides a housing structure that includes a push button coupled to the battery cover. The present housing structure enables a user to remove/insert the battery without holding the battery cover. The present housing structure also enables the user to use one hand to press the push button while use the other hand to insert/remove the battery.

The housing structure in accordance with the present disclosure includes a housing, a push button, a push button cover, and a torsion spring. The housing defines a battery chamber that can accommodate a battery. The push button is positioned within a first slot of the housing such that a user can push the push button from the outside of the housing. In some embodiments, the push button can be positioned to be flush with an outer surface of the housing. The push button is coupled to a battery cover. The battery cover is positioned within a second slot of the housing. When a user pushes the push button, the battery cover can be moved accordingly. The second slot is positioned adjacent to the first slot. In some embodiments, the battery cover can be positioned to be flush with an outer surface of the housing.

The push button cover and the torsion spring are positioned in the housing. The housing includes a pillar or a protrusion configured to position or support the torsion spring by operably passing through the torsion spring. One end of the torsion spring is coupled to the push button cover, and the other end of the torsion spring is coupled to the push button. The housing also includes guiding pillars or guiding protrusions to position or support the push button cover. Accordingly, the push button cover can include multiple holes or recesses to accommodate the guiding pillars, such that the push button cover can be fixedly attached to the housing.

By so doing, the push button cover can support the push button when a user pushes the push button toward the inside of the housing (i.e., toward the push button cover). Once the push button (and the battery cover) is moved toward the inside of the housing, the battery cover is moved from an initial (closed) position to an open position. When the battery cover is moved, a gap or space is formed between the battery cover and the housing. The gap or space enables a user to insert a battery into the battery chamber or remove one therefrom. When the user finishes inserting/removing the battery, he/she can release the push button. The torsion spring then provides a resilient force to move the push button (and the battery cover) toward the outside of the housing back to the closed position. When the battery cover is in the closed position, the battery positioned inside the housing is secured and well-protected.

Figure 2:
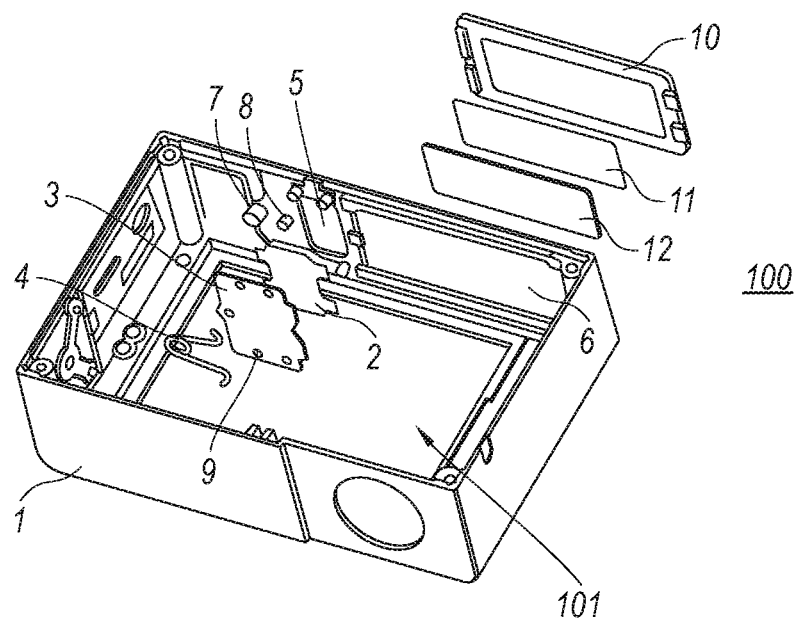
FIG. 2 is an explosive, isometric view illustrating a housing structure in accordance with embodiments of the present disclosure.

FIG. 1 is an isometric view illustrating a housing structure 100 in accordance with embodiments of the present disclosure. A battery can be positioned in a battery chamber 101 inside the housing structure 100. In some embodiments, the housing structure 100 can be a camera housing structure. In other embodiments, the housing structure 100 can be any housing structure that can accommodate a battery. FIG. 2 is an explosive, isometric view illustrating the housing structure 100 in accordance with embodiments of the present disclosure. FIG. 1 and FIG. 2 together illustrate components of the housing structure 100 and the structural features thereof.

As shown in FIGS. 1 and 2, the housing structure 100 includes a housing 1, a push button 2, a push button cover 3, a torsion spring 4, a first slot 5, a second slot 6, a pillar 7, multiple guiding pillars 8, and a battery cover 10. As shown, the shape of the first slot 5 corresponds to the shape of the push button 2, and the shape of the second slot 6 corresponds to the shape of the battery cover 10. In some embodiments, the second slot 6 is positioned adjacent to the first slot 5. The push button 2 is positioned within the first slot 5 of the housing 1 such that a user can push the push button 2 from the outside of the housing 1 (e.g., through the first slot 5).

The push button 2 is coupled to the battery cover 10. In some embodiments, the batter cover 10 and the push button 2 are fixedly coupled by welding. In other embodiments, the batter cover 10 and the push button 2 can be coupled by other suitable means. In one embodiment, for example, the battery cover 10 and the push button 2 can be coupled by a linkage device. In some embodiments, the batter cover 10 and the push button 2 can be integrally formed. As shown in FIGS. 1 and 2, the battery cover 10 is positioned within to the second slot 6 of the housing 1.

In the illustrated embodiments, the push button cover 3 and the torsion spring 4 are positioned in the housing 1. As shown, the pillar 7 is configured to position or support the torsion spring 4. In some embodiments, the torsion spring 4 can be operably connected to the pillar 7. The pillar 7 is positioned to pass through a center hole of the torsion spring 4. One end of the torsion spring 4 is coupled to the push button cover 3, and the other end of the torsion spring 4 is coupled to the push button 2. The guiding pillars 8 are configured to position or support the push button cover 3 (e.g., to fixedly couple the push button cover 3 to the housing 1). Accordingly, the push button cover 3 includes multiple holes or recesses 9 to accommodate the corresponding guiding pillars 8. By this arrangement, the push button cover 3 can be fixedly attached to the housing 1 such that the push button cover 3 can support the push button 2 when a user pushes the push button 2 toward the inside of the housing 1 (i.e., toward the push button cover 3).

When a user wants to position a battery in the battery chamber 101 (or remove one therefrom), he/she can push the push button 2 toward the inside of the housing 1. Accordingly, the battery cover 10 is moved and/or rotated from an initial (closed) position to an open position. The movement or the rotation of the battery cover 10 provides a space or a gap between the battery cover 10 and the housing 1 for the user to insert a battery into the battery chamber 101 (or remove a battery therefrom). When a user completes the process of inserting or removing a battery, he/she can release the push button 2. The torsion spring 4 can then move the push button 2 (and the battery cover 10) toward the outside of the housing 1 back to the initial (closed) position. When the battery cover is in the closed position, the battery positioned inside the housing 1 is secured and well-protected.

In the illustrated embodiments shown in FIG. 2, the housing structure 100 also includes an adhesive layer 11 and a steel battery-cover plate 12. The adhesive layer 11 and the steel battery-cover plate 12 are designed to cover and protect the battery positioned inside the housing 1. In some embodiments, the steel battery-cover plate 12 can be configured to electrically couple to the battery.

Figure 3A:
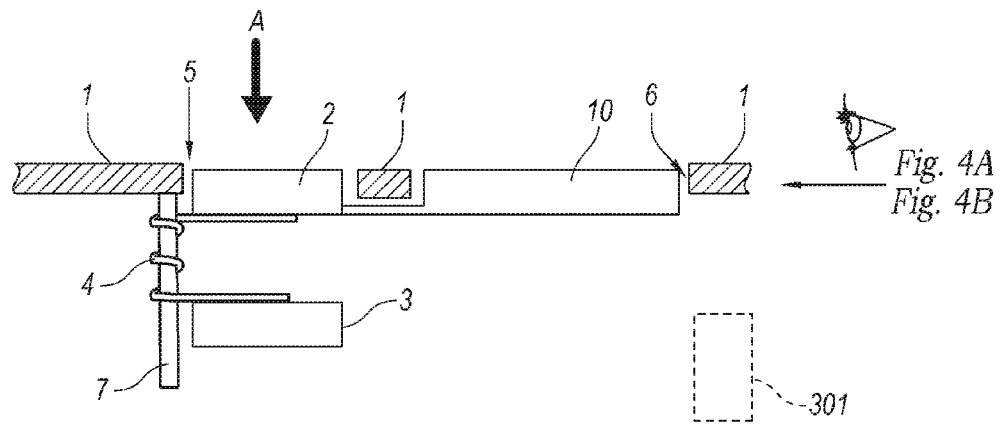
FIG. 3A is a schematic side view illustrating an initial (closed) position of a battery cover and a push button in accordance with embodiments of the disclosed technology.

FIG. 3A is a schematic side view illustrating an initial (closed) position of a battery cover 10 and a push button 2 in accordance with embodiments of the disclosed technology. The housing 1 is configured to accommodate a battery 301 positioned therein. As shown in FIG. 3A, the push button 2 is fixedly coupled to the battery cover 10. In the illustrated embodiment, the push button 2 and the battery cover 10 are positioned to be (substantially) flush with an outer surface of the housing 1. In some embodiments, the push button 2 and the battery cover 10 can be positioned extending through the housing 1. For example, the push button 2 can extend through the housing 1 by passing through the first slot 5, and the battery cover 10 can extend through the housing 1 by passing through the second slot 6. In some embodiments, the push button 2 and the battery cover 10 can be shaped based on the shape of the housing 1.

As shown in FIG. 3A, the push button 2 is coupled to one end of the torsion spring 4. The other end of the torsion spring 4 is coupled to the push button cover 3. The push button cover 3 is fixedly coupled to the housing 1 (e.g., by the guiding pillars 8 shown in FIGS. 1 and 2) such that it can support and facilitate positioning the push button 2. As shown in FIG. 3A, the push button 2 and the battery cover 10 are in their closed positions. The battery cover 10 can protect the battery 301 positioned in the housing 1. When a user wants to open the battery cover 10, he/she can push the push button 2 in direction A. The movements and/or the rotations of the push button 2 and the battery cover 10 in response to the user's action will be discussed in detail with reference to FIGS. 3B, 4A and 4B below.

Figure 3B:
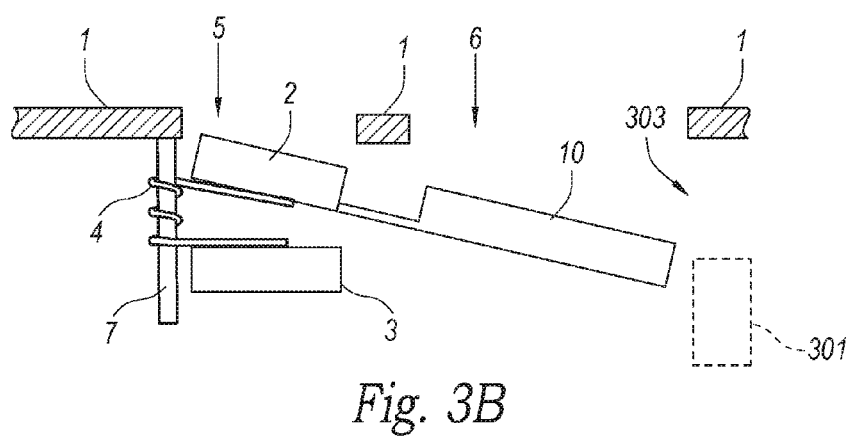
FIG. 3B is a schematic side view illustrating an open position of a battery cover and a push button in accordance with embodiments of the disclosed technology.

FIG. 3B is a schematic side view illustrating an open position of the battery cover 10 and the push button 2 shown in FIG. 3A in accordance with embodiments of the disclosed technology. When a user pushes the push button 2 in direction A, the push button 2 and the battery cover 10 are moved and/or rotated accordingly toward the inside of the housing 1. As shown in FIG. 3B, a gap or space 303 is formed between the housing 1 and the battery cover 10. The user can then remove the battery 301 through the gap 303. Similarly, the user can also insert the battery 301 into the housing 1 through the gap 303.

Figure 3C:
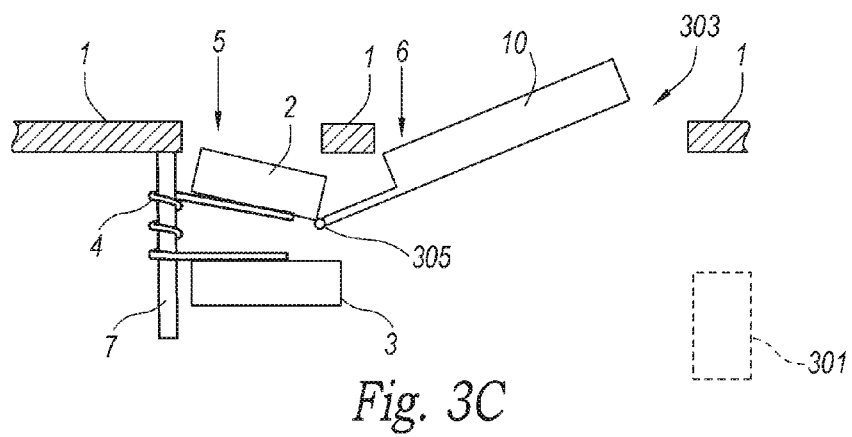
FIG. 3C is a schematic side view illustrating an open position of a battery cover and a push button in accordance with embodiments of the disclosed technology.

FIG. 3C is a schematic side view illustrating another open position of the battery cover 10 and the push button 2 in accordance with embodiments of the disclosed technology. In the illustrated embodiment in FIG. 3C, the battery cover 10 and the push button 2 are coupled by a hinge 305. The hinge 305 enables the push button 2 and the battery cover 10 to rotate relatively to each other. As shown, the rotation of the battery cover 10 provides more space (e.g., larger gap 303) for a user to insert the battery 301 into the housing 1 or to remove the battery 301 therefrom.

Figure 4A:
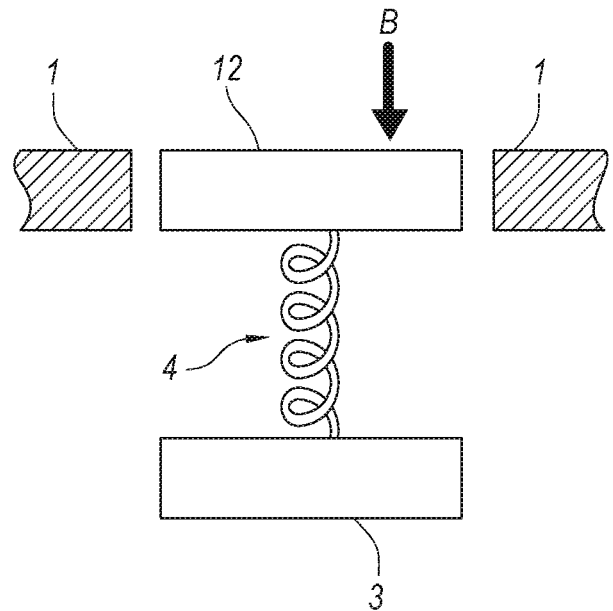
FIG. 4A is a schematic side view illustrating an initial (closed) position of a battery cover in accordance with embodiments of the disclosed technology.
Figure 4B:
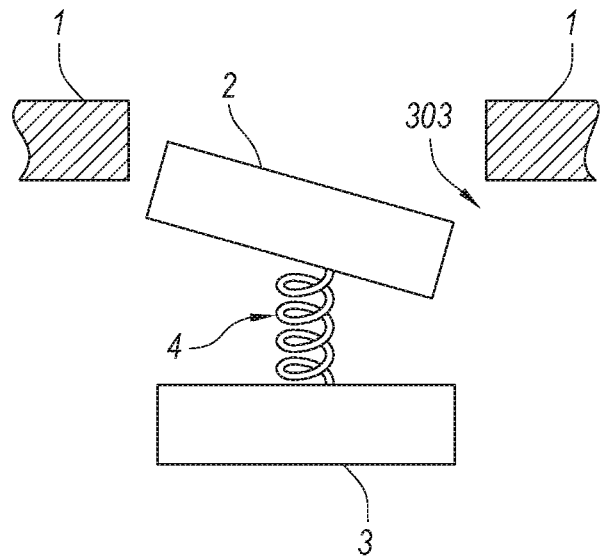
FIG. 4B is a schematic side view illustrating an open position of a battery cover in accordance with embodiments of the disclosed technology.

FIGS. 4A and 4B are schematic side views illustrating the movement and/or the rotation of the battery cover 10 in response to a user's action. In FIG. 4A, the battery cover 10 in an initial (closed) position and a battery 401 is positioned inside the housing 1. When a user wants to open the battery cover 10, he/she can push the push button 2 in direction B. Accordingly, the battery cover 10 can be rotated or moved toward the inside of the housing 1, as shown in FIG. 4B. In FIG. 4B, a gap or space 403 is formed between the battery cover 10 and the housing 1. The user can then remove the battery 401 through the gap 403. Similarly, the user can also insert the battery 401 into the housing 1 through the gap 403.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. An apparatus for accommodating a battery, comprising:
a housing having a first slot and a second slot adjacent to the first slot, wherein the first slot has a first shape, and wherein the second slot has a second shape;
a push button positioned within the first slot of the housing, wherein the push button is formed corresponding to the first shape;
a torsion spring positioned within the push button, wherein the torsion spring has a first end and a second end, and wherein the first end is coupled to the push button;
a push button cover fixedly coupled to the housing and positioned adjacent to the push button, wherein the push button cover is coupled to the second end of the torsion spring; and
a battery cover fixedly coupled to the push button and positioned within the second slot, wherein the battery cover is formed corresponding to the second slot.

2. The apparatus of claim 1, further comprising a pillar fixedly coupled to the housing, wherein the pillar is positioned to pass through a center hole of the torsion spring.

3. The apparatus of claim 1, further comprising a protrusion extended from the housing, wherein the protrusion is positioned to pass through a center hole of the torsion spring.

4. The apparatus of claim 1, further comprising a plurality of guiding pillar positioned to couple to the push button cover.

5. The apparatus of claim 4, wherein the push button cover includes a plurality of holes configured to accommodate the plurality of guiding pillars.

6. The apparatus of claim 1, further comprising a plurality of guiding protrusions positioned to couple to the push button cover.

7. The apparatus of claim 6, wherein the push button cover includes a plurality of recesses configured to accommodate the plurality of guiding protrusions.

8. The apparatus of claim 1, further comprising an adhesive layer attached to the battery cover.

9. The apparatus of claim 1, further comprising a steel battery-cover plate attached to the adhesive layer.

10. A camera apparatus, comprising:
a housing having a first slot and a second slot adjacent to the first slot, wherein the housing defines a battery chamber;
a battery positioned in the battery chamber;
a push button positioned adjacent to the housing, wherein the push button extends at least partially through the housing;
a torsion spring positioned adjacent to the push button, wherein the torsion spring has a first end and a second end, and wherein the first end is coupled to the push button;
a push button cover fixedly coupled to the housing and positioned adjacent to the push button, wherein the push button cover is coupled to the second end of the torsion spring; and
a battery cover fixedly coupled to the push button, wherein the battery cover extends at least partially through the housing, and wherein the battery cover facilitate positioning the battery in the battery chamber.

11. The apparatus of claim 10, wherein the battery cover is in a closed position.

12. The apparatus of claim 11, wherein the battery cover is moved from the closed position to an open position in response to a movement of the push button.

13. The apparatus of claim 12, wherein the torsion spring provides a resilient force to the battery cover when the battery cover is in the open position.

14. The apparatus of claim 11, wherein the battery cover is moved from the closed position to an open position in response to a rotation of the push button.

15. The apparatus of claim 14, wherein the torsion spring provides a resilient force to move the push button back to an initial position when the battery cover is in the open position.

16. A housing apparatus, comprising:
a housing having a first slot and a second slot adjacent to the first slot, wherein the first slot has a first shape, and wherein the second slot has a second shape;
a push button positioned within the first slot of the housing, wherein the push button is formed corresponding to the first shape;
a torsion spring positioned adjacent to the push button, wherein the torsion spring has a first end and a second end, and wherein the first end is coupled to the push button;
a push button cover fixedly coupled to the housing and positioned adjacent to the push button, wherein the push button cover is coupled to the second end of the torsion spring; and
a battery cover fixedly coupled to the push button and positioned within the second slot, wherein the battery cover is formed corresponding to the second slot, wherein the batter cover is moveable between a closed position and an open position.

17. The apparatus of claim 16, wherein when the battery cover is in the closed position, the battery cover is substantially flush with an outer surface of the housing.

18. The apparatus of claim 16, when the battery cover is in the closed position, the push button is substantially flush with an outer surface of the housing.

19. The apparatus of claim 16, wherein when the battery cover is in the open position, the battery cover and the housing together form a gap.

20. The apparatus of claim 16, wherein when the battery cover is in the open position, the push button and the housing together form a gap.

* * * * *